United States Patent
Roth et al.

(10) Patent No.: US 10,810,495 B2
(45) Date of Patent: Oct. 20, 2020

(54) METHODS FOR DATA ENCODING IN DNA AND GENETICALLY MODIFIED ORGANISM AUTHENTICATION

(71) Applicant: UNIVERSITY OF WYOMING, Laramie, WY (US)

(72) Inventors: Don Roth, Laramie, WY (US); Siguna Mueller, Launsdorf (AT); Farhad Jafari, Laramie, WY (US)

(73) Assignee: UNIVERSITY OF WYOMING, Laramine, WY (US)

( * ) Notice: Subject to any disclaimer, the term of this patent is extended or adjusted under 35 U.S.C. 154(b) by 84 days.

(21) Appl. No.: 16/137,258

(22) Filed: Sep. 20, 2018

(65) Prior Publication Data

US 2019/0089372 A1    Mar. 21, 2019

Related U.S. Application Data

(60) Provisional application No. 62/560,881, filed on Sep. 20, 2017.

(51) Int. Cl.
| | |
|---|---|
| *H03M 13/09* | (2006.01) |
| *H03M 13/00* | (2006.01) |
| *G06N 3/12* | (2006.01) |
| *H03M 7/40* | (2006.01) |

(52) U.S. Cl.
CPC .............. *G06N 3/123* (2013.01); *H03M 7/40* (2013.01); *H03M 13/095* (2013.01); *H03M 13/611* (2013.01)

(58) Field of Classification Search
CPC ...... G06N 3/123; H03M 7/40; H03M 13/095; H03M 13/611
See application file for complete search history.

(56) References Cited

U.S. PATENT DOCUMENTS

| | | | | |
|---|---|---|---|---|
| 2006/0286569 A1* | 12/2006 | Bar-Or | ..................... | C12Q 1/68 435/6.11 |
| 2011/0202280 A1* | 8/2011 | Sikora | .................. | C12Q 1/6874 702/19 |
| 2015/0261664 A1* | 9/2015 | Goldman | ............... | G16B 50/40 711/154 |
| 2016/0246892 A1* | 8/2016 | Murrah | ................ | G06K 7/0004 |
| 2017/0141793 A1* | 5/2017 | Strauss | ................. | H03M 13/05 |
| 2018/0152535 A1* | 5/2018 | Sade | ....................... | H04L 67/06 |

(Continued)

OTHER PUBLICATIONS

De Silva, P.Y., et al., "New Trends of Digital Data Storage in DNA", Hindawi Publishing Corporation BioMed Research International vol. 2016, Article ID 8072463, pp. 1-14. (Year: 2016).*

(Continued)

*Primary Examiner* — Kyle Vallecillo

(74) *Attorney, Agent, or Firm* — Patterson + Sheridan, LLP (57) ABSTRACT

A method is disclosed comprising encoding a message into blocks, determining a collection of DNA symbols for each of the blocks from the encoded message, performing a second encoding of the determined collection of DNA symbols from the encoded message, detecting a presence of errors in the second encoding and establishing an authentication of each block and further using zero-knowledge protocol to securely authenticate the message without disclosing the actual message.

17 Claims, 4 Drawing Sheets

Specification includes a Sequence Listing.

(56) References Cited

U.S. PATENT DOCUMENTS

2019/0355442 A1* 11/2019 Merriman ............ C12Q 1/6869

OTHER PUBLICATIONS

S. Mueller, Some Remarks on Williams' Public-Key Crypto-Functions. The Fibonacci Quarterly, vol. 44.3, pp. 224-234, 2006.
S. Mueller, A Survey of IND-CCA Secure Public Key Encryption Schemes Relative to Factoring. Public Key Cryptography and Computational Number Theory. K. Alster, J. Urbanowicz, H.C. Williams (eds.), DeGruyter, 2001.
S. Mueller, On the Security of a Williams Based Public Key Encryption Scheme. Public Key Cryptography, PKC'01. K. Kim (ed.), LNCS 1992, Springer, Berlin, 2001, pp. 1-18.
S. Mueller, On the Security of an RSA Based Encryption Scheme. Information Security and Privacy. Pieprzyk, J., Safavi-Naini, R., Seberry, J. (eds.), LNCS 1587, Springer, Berlin, 1999, pp. 135-148.
S. Mueller, W.B. Mueller, The Security of Public Key Cryptosystems Based on Integer Factorization. Information security and privacy. Colin Boyd, Ed Dawson (eds.), LNCS 1438, Springer, Berlin, 1998, pp. 9-23.
Church et al, Next-Generation Digital Information Storage in DNA, Science, vol. 337, Sep. 28, 2012, 2 pp.
Erlich et al, DNA Fountain Enables a Robust and Efficient Storage Architecture, Science, vol. 355, Mar. 3, 2017, 5 pp.

* cited by examiner

METHODS FOR DATA ENCODING IN DNA AND GENETICALLY MODIFIED ORGANISM AUTHENTICATION

CROSS-REFERENCE TO RELATED APPLICATIONS

The present application claims priority to U.S. Provisional Application 62/560,881 dated Sep. 20, 2017, the entirety of which is incorporated by reference.

FIELD OF THE DISCLOSURE

Aspects of the disclosure relate to placing and reading data on a storage device in a highly secure fashion. More specifically, aspects of the disclosure relate to placing and accurately decoding/translating data in DNA structures or into the genome of target organisms and methods for encoding data in DNA. In other embodiments, aspects of the disclosure relate to decoding/translating data directly to DNA sequences without stable insertion into an organism.

BACKGROUND INFORMATION

DNA may be used to store information/data related to variety of subjects. Such encoding of data may be present in a biological host, without serious repercussions to the organism. As DNA structures are long and complex, a variety of data, including video, photographs, words, and numbers, may be placed in DNA structures. Essentially any data convertible to binary can be translated into DNA sequence. Although it can be stored as DNA, it also may be inserted and recovered from the target organism genome. The data may be placed in large amounts according to the needs of the encoder.

While encoding of data into DNA and inserting into the host genome is known, deciphering the data from stored DNA sequence or from the host genome can be problematic. Inherent complexities of DNA sequencing introduce the possibility of errors in decoding from DNA directly. Insertion, recovery and translation of DNA sequence from target hosts that are biological and subject to replication error and can be mobile and subjected to various environmental conditions, can be complicated by errors from these issues and others. Such errors, unfortunately, can severely impact the usefulness of the using organic structures as DNA data storage units.

Complicating matters related to DNA encoded data, multiple types of DNA methods exist for concealing data, such as DNA steganography, sequence alignment and next generation sequencing such that each type of encoding presents a unique sequence and challenge.

Conventionally, there are no easy processes or methods that are presently known to limit the errors read from data inserted into DNA and of data embedded into DNA that is present in genome of the target host.

There is a need, therefore, to provide for a method of encoding and decoding data from DNA directly stored and from DNA in a host to allow the data to be read with accuracy.

There is a further need to provide for a method of reading encoded data such that errors present in the data may be identified such that the data that is provided is useful to a person receiving the data.

There is a need to provide a method for development supply chain tracking of genetically engineered organisms.

There is a further need to provide a method to ensure authentication of certified genetic goods from counterfeiting, malicious attack, and/or directed modification.

There is a still further need to provide for methods that build on highly secure advanced cryptographic codes such that reading and authentication of the coded information remain concealed even from third parties utilizing the code.

SUMMARY

In one non-limiting embodiment, a method is disclosed comprising: encoding a message into blocks, determining a collection of DNA symbols for each of the blocks from the encoded message, performing a second encoding of the determined collection of DNA symbols from the encoded message, detecting a presence of errors in the second encoding, and establishing an authentication of each block.

In another non-limiting embodiment, a method of encoding data in DNA is disclosed comprising obtaining a set of data to be encoded, subdividing the set of data into equal length blocks, converting the subdivided set of data into A, C, G and T DNA components sequencing a number of copies of the converted set of data and establishing an authentication of each of the set of converted data.

In another non-limiting embodiment, a method of encoding data in DNA is disclosed comprising obtaining a set of data to be encoded, subdividing the set of data into equal length blocks, converting the subdivided set of data into A, C, G and T DNA components, sequencing a number of copies of the converted set of data, establishing an authentication of each of the set of converted data by a cryptographic based algorithm and decoding the sequenced number of copies of the converted set of data.

In another non-limiting embodiment, to label the DNA with a signature and make the signature invisible, for every signature string generated, a fake signature is created using a random sequence of nucleotides of the same length as a valid signature, giving each clone adequate information for identification whether or not it is a signature carrying clone and, as each string will have both a valid and a fake element, it will become virtually impossible to correctly select the authentic signature. The cryptographic methods used are based on zero-knowledge and confirmer signature techniques, and are much more advanced and secure than the AES and RSA approaches.

DETAILED DESCRIPTION

Aspects of the disclosure relate to methods for decoding data inserted into target DNA sequence. Aspects of the methods also provide for an accurate decoding of data placed directly into DNA that may also be stably inserted into a target host genome. Some aspects of the methods use an algorithm that provides for advantages that conventional processes lack.

One feature of an algorithm described above can be subdivided into five (5) operations. These features include:

(1) Generation of each block of data as a sequence of nucleotides that occurs at least R•S-fold and that is randomized by number 7 in OPERATION 1. This prevents any detrimental structure that would interfere with sequencing.

(2) Randomization is only a function of the base 2 to base 4 conversion and hence, does not require a random key during decryption as it is not a stream cipher or a one-time pad.

(3) Each block represents information about data as well as the address and is then further randomized. The code represents each (randomized and expanded) message block $m_i$ exactly R times within each DNA segment.

$$\underbrace{m_1 \| m_1 \| \ldots \| m_1}_{\substack{\Downarrow \text{ Repeated R times} \\ \text{Encoded as nt's}}}, \quad \ldots \quad \underbrace{m_n \| m_n \ldots \| m_n}_{\substack{\Downarrow \text{ Repeated R times} \\ \text{Encoded as nt's}}}$$

$$\underbrace{\text{DNA segment } DNA_1,}_{\Downarrow \text{Amplif.\& Sequ. to}} \quad \ldots \quad \underbrace{\text{DNA segment } DNA_n}_{\Downarrow \text{Amplif.\& Sequ. to}}$$

$sequ. (DNA_1)_1, \ldots, sequ. (DNA_1)_s \ldots sequ. (DNA_n)_1, \ldots, sequ. (DNA_n)_s$

(4) The above is essentially an R•S repetition code. Each of the recovered S sequences $(DNA_i)_j$ is made up of a collection of R blocks of $m_i$.

Figure 2:
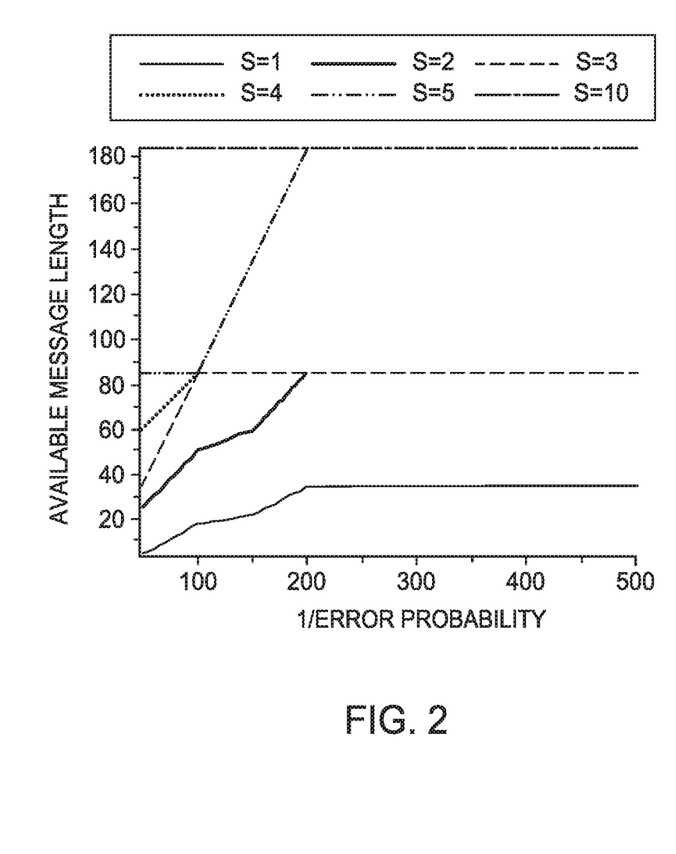
FIG. 2 is a graph of available message length vs 1/Error Probability

(5) The choice of R is dictated by the parameter S as well as the anticipated and required security. Both R and S work in concert. The larger R is, the more "expensive" in terms of message expansion but is more secure (FIG. 2).

The oligonucleotide library is sequenced using next-generation sequencing technologies. The decoding scheme identifies each base of encoded information based on a majority vote of all the read bases corresponding to its position. The final decoding into the message file from the sequencing reads is obtained by exactly reversing the encoding process.

Operation 1: Encoding Operations: The original text or data to be encoded is subdivided into equal length blocks. Each block contains both the data part and the corresponding addressing information. Combining both into one block before repetition and sequencing helps to ensure proper placement during decoding.

1. Represent the original message in binary and let $len(M)$ be the length (in characters) of the binary representation of M.
2. Let $l_M$ be the representation of $len(M)$ in binary, as appropriate prepend with zeros to give a fixed length, generate the fixed length binary block $\tilde{M}=M|0\ldots0|l_M$ by adding in zeros so that the length of $\tilde{M}$ is a multiple of $l/R-l_{id}$.
3. Divide $\tilde{M}$ into pieces $\tilde{M}_i$ of equal length $l/R-l_{id}$.

$$\tilde{M} = \underbrace{\tilde{M}_1}_{\text{of length } l/R-l_{id}} \| \underbrace{\tilde{M}_2}_{\text{of length } l/R-l_{id}} \| \ldots \| \underbrace{\tilde{M}_n}_{\text{of length } l/R-l_{id}}. \quad (1)$$

4. This exactly incorporates all of $\tilde{M}$.
5. Let $ID_{bin}$ be a (fixed length) binary string identifying the original file and unique with a given experiment. For each counter 1 obtained in operation 2, find the binary representation of i. Let $ID_i$ be the concatenation of $ID_{bin}$ and the binary representation of i. If needed, prepend the later with zeros to give the fixed length $i_{id}$ for each $ID_i$.
6. Incorporate the identifier $ID_i$ into each block of $\tilde{M}_i$ to get $$m = \underbrace{\tilde{M}_1 \| ID_1}_{\text{of length } l/R} \| \underbrace{\tilde{M}_2 \| ID_2}_{\text{of length } l/R} \| \ldots \| \underbrace{\tilde{M}_n \| ID_n}_{\text{of length } l/R}. \quad (2)$$

7. This divides m into equal size blocks $m=m_1\|m_2\|\ldots\|m_n$, where $m_i=\tilde{M}_i\|ID_i$.
8. Represent each block R times which will give the individual DNA segments of length l, i.e., let $$t = \underbrace{m_1\|m_1\|\ldots\|m_1}_{\text{represented as R copies}}, \underbrace{m_2\|m_2\|\ldots\|m_2}_{\text{represented as R copies}}, \ldots, \underbrace{m_n\|m_n\|\ldots\|m_n}_{\text{represented as R copies}}.$$

$$= \underbrace{t_1}_{\text{has length } l}, \underbrace{t_2}_{\text{has length } l}, \ldots, \underbrace{t_n}_{\text{has length } l}$$

9. In the basic scheme, we use standard methods to achieve randomization. This is generated by the base-2 to base-4 conversion. Generally, given the binary string $s=s_1s_2\ldots s_n$, this gives one of the four values A, C, G, T according to A or C randomly, if $S_i=0$ and T or G randomly if $s_i=1$ for each i. This randomization is applied here to $t=t_1t_2,\ldots,t_n$ but with the stronger restriction of avoiding homopolymer runs of length≥2. This gives the base four oligos $f_1=F(t_1), f_2=F(t_2), \ldots, f_n=F(t_n)$ in terms of the four nucleotides (nts) A, C, G, T.

Operation 1 may be augmented via a 7 operation process described below. The original DNA sequence along with the addressing information is subdivided into blocks of length l. Instead of amplifying and sequencing each block as it contains the base four representation of the data along with their identifiers that might lead to sequencing errors, each of the blocks are masked by some randomizing features. The key to code and decode this randomization is appended to each block. Consequently, both the original part containing the nt and the appended randomizer convert each block into arbitrary sequences with (pseudo) random properties. As random strings, they can be amplified and sequenced. Since representation in base 3 is somewhat more efficient than in base 2, base 3 representation is used with base 3 to base 4 (i.e. DNA) representation accomplished via an algorithm.

1. Represent the original message M as a concatenation of base 3 strings that are obtained via the Huffman algorithm and append enough zeros to M to get $\tilde{M}=M0\ldots0$ so that the length of this is a multiple of $l/R-l_{id_r}$. The Huffman operation adds further efficiency and uniqueness in decoding. Without this operation, the length of M, $l_M$ needs to be appended, as above (see the example below).

2. Split M into piece $\tilde{M}_i$ of equal length $l/R-l_{id}-l_r$.

$$\tilde{M} = \underbrace{\tilde{M}_1}_{\text{of length } l/R-l_{id}-l_r} \| \underbrace{\tilde{M}_2}_{\text{of length } l/R-l_{id}-l_r} \| \ldots \| \underbrace{\tilde{M}_n}_{\text{of length } l/R-l_{id}-l_r}. \quad (3)$$

By operation 1 this exactly divides out all of $\tilde{M}$.

3. Let $ID_{ter}$ be a fixed length base 3 string identifying the original file and unique with a given experiment. For each counter 1 obtained in operation 2, let $ID_i$ be the concatenation of $ID_{ter}$ and the base3 representation of l, the latter prepended with zeros as needed to give the fixed length $l_{id}$ for each $ID_i$.

4. Incorporate the identifier $ID_i$ into each block of $M_i$ to get the below sequence.

$$\tilde{m} = \underbrace{\tilde{M}_1 \| ID_1}_{\text{of length } l/R-l_r} \| \underbrace{\tilde{M}_2 \| ID_2}_{\text{of length } l/R-l_r} \| \ldots \| \underbrace{\tilde{M}_n \| ID_n}_{\text{of length } l/R-l_r}. \quad (4)$$

This divides m into equal size blocks $\tilde{m}=\tilde{m}_1\|\tilde{m}_2\| \ldots \|\tilde{m}_n$.

5. For each piece in m chose a random string $r_i$ of constant length $l_r$ and compute.

$$m = \underbrace{\tilde{m}_1 \oplus_3 e(r_1)\|r_1}_{\text{of length } l/R}\|\underbrace{\tilde{m}_2 \oplus_3 e(r_2)\|r_2}_{\text{of length } l/R}\| \ldots \|\underbrace{\tilde{m}_n \oplus_3 e(r_n)\|r_n}_{\text{of length } l/R}. \quad (5)$$

Here, $\oplus_3$ denotes direct sum modulo 3. This divides m into equal size blocks $m=m_1\|m_2\| \ldots \|m_n$ where $m_i=\tilde{m}_i\oplus_3 e(r_i)\|r_i$.

6. Represent each block R times, i.e., let $$t = \underbrace{\underbrace{m_1\|m_1\| \ldots \|m_1}_{\text{represented as R copies}}, \underbrace{m_2\|m_2\| \ldots \|m_2}_{\text{represented as R copies}}, \ldots, \underbrace{m_n\|m_n\| \ldots \|m_n}_{\text{represented as R copies}}}$$
$$= \underbrace{t_1}_{\text{has length } l}, \underbrace{t_2}_{\text{has length } l}, \ldots, \underbrace{t_n}_{\text{has length } l}.$$

7. Represent DNA as A, C, G, T (rather than base 3) using the base 3 to DNA encoding.

Operation 2: Generation of DNA

1. Determine the code as a collection of DNA segments $G(f)=G(f_1), \ldots, G(f_n)$ where G denotes the physical representation and synthesis of DNA corresponding to the design given in segment $t_i$ of length l (oligo library synthesis).
2. Perform the characterization algorithms (e.g., [4], see [10]) to validate the correctness of the synthesized library.
3. Amplify and sequence a sufficient number of copies (i.e. S times) to ensure that each base of the original message will be recovered at least S times.

Operation 3: Improved Encoding

A cryptographic randomization function is chosen as follows to ensure sufficient randomness in number 7 in Operation 1. Select a cryptographic expansion function e that takes as input short random strings r and outputs longer (for the algorithm in [10]-ternary) strings e(r) that are random. Select $l_r$ the length of the input string r and let the output length be $l/R-l_r$.

For the improved encryption scheme, the repetition also results in a R•S repetition code. The main difference is the randomization via $\tilde{m}_i\oplus_3 e(r_i)\|r_i$ which makes each component completely (pseudo-)random. This operation could be realized in binary (as above), or designed in combination with other codes from coding theory. The Huffman code that we apply has several additional robustness features. The decoding is the reverse of coding protocol. In addition, each $m_i$ needs to be recovered in (5) by recovering $r_i$ and recomputing $e(r_i)$. This allows the computation of $\tilde{m}_i$ from the first part of each $m_i$. Continuing as above, this yields $\tilde{M}$. The original data length does not have to be included but may be. Rather decoding follows from properties of the Huffman table. Beginning at the first part of M find the corresponding Huffman text words of length 5 or 6 (whichever is found in the Huffman table). Because there is no Huffman code word in the table that consists only of zeros, the process terminates when the next block of length 5 or 6 is all zeros.

Using a Huffman code has independent advantages, in addition to what is needed for error correction. It leads to shorter average text lengths than for fixed length codes. Moreover, Huffman code words that are tabulated give additional protection against errors. Indeed, there are a total of $3^5+3^6$ ternary words of length 5 or 6 but only a few hundred of these are words used in the table. Finally, it automatically offers additional robustness via the individual word lengths, e.g. the original text length follows from the individual Huffman codewords and does not need to be included explicitly in $\tilde{M}$.

The randomization operation provides true pseudo-randomness that should provide adequate scrambling of the nt's to prevent detrimental DNA structure and formation. Each component in the message is a completely random string. Nonetheless the randomization key is automatically obtained during decoding and does not require any additional operations (e.g. sending the key to the decoder). Different $r_i$'s are chosen to avoid the presence of the same part r. Randomization provides a mechanism to identify mutations in living systems. Algorithms described for in vitro applications can be extended to in vivo approaches.

Throughout it is assumed that both R and S are greater than or equal to 1. Thus, after sequencing each original base is recovered at least once, and each block is repeated R greater than or equal to 1 times. The decoding scheme identifies each base of encoded information based on a majority vote of all the read bases corresponding to its position. As each base of encoded information is represented R times, due to their minimal base coverage S, each will be represented R S time in our R S repetition code. From this it follows that the minimum distance of our encoding scheme is R S. Practically, the distribution of the mean number of times each base of encoded information is sequenced and the base coverage follows a normal distribution. The limiting issue is the minimum of these termed S. Quality control and evaluation of current sequencing algorithms dictates how many sequences need to generated (i.e., how large $\tilde{S}$ needs to be) to obtain $S>1$. These do not correct situations where $S=0$.

Operation 4: Detection of any Errors, Including Those During Message DNA Preparation Using an R•S-fold repetition codes, allows the detection and correction of many substitution errors during sequencing, storage and decoding, but it cannot correct errors due to insertion or deletion, or if the error occurred earlier i.e., during message DNA preparation, even when R or S is large.

Unfortunately there is no system that would provide security and protection against errors that are introduced at the level of message DNA preparation. Such errors cannot be fixed by the synthesis of enough oligonucleotides (oligos). These types of errors may lead to inaccurate decoding and change the meaning of the recovered message. This would be extremely harmful situation when the change of meaning is not obvious or when there is no way to assign meaning, as with a cryptographic key or access code.

In such a case, it would be desirable, at least, to be aware of such errors. The GC content may be compared to the k-mer frequencies along the reads with the designed DNA strings. This approach may not be able to detect data loss during the sequencing reaction. It would also not identify errors made during initial message DNA generation. For instance, faulty oligos can mimic a desired GC content and pass the checking routine. The following approach will address these issues.

1. During encoding, append the hash value $H(\tilde{M})$ to $\tilde{M}$
2. During decoding recompute the hash value of the first part of $\tilde{M}$ and compare it to the given hash value these values can only agree if no errors had occurred.

In information theory, cryptographic hash functions are a means for ensuring authenticity. For example, they are used to check whether a file has been changed. The hash value of the file is stored separately and the integrity of the file is checked by computing the hash value of the actual file and comparing it with the stored hash value. If the hash values are the same, then the file is unchanged. Secure hash functions have been developed that are mathematically strong in a range of situations.

This operation improves the previous algorithms by providing proof if errors occurred during message DNA generation. Practically, hash functions generate a very short output so the cost in message expansion via $H(M)$ is minimal. While it is easy to append the hash value to $\tilde{M}$, the added number of strings impacts efficiency. Effectively, the available message length is shortened by whatever length the hash value requires.

Operation 5: Establishing Authenticity of the Individual Segments—

In order to achieve this without knowledge of the message meaning two modifications to the above scheme are needed during encoding.

1. Choice of security parameter and identifiers. Let k be a small number, e.g. k=10 or 15 (this will be further described below). Modify number 3 in Operation 3 as follows. Let $ID_i=ID_{ter}\|1^k\|0 \ldots \|0i_3$, wherein $i_3$ is the base-3 representation of i, prepended with zeros so that $ID_i$ is of fixed length $l_{id}$. The difference to the above is that k 1's are inserted in each identifier. This special structure will be used during a verification operation during decoding.
2. Computation of m: Update equation (5) as follows:

$$m = \underbrace{\tilde{m}_1 \oplus_3 e(r_1) \| r_1 \oplus_3 H(\tilde{m}_1 \oplus_3 e(r_1)) \|}_{\text{of length } l/R} \ldots \| \underbrace{\tilde{m}_n \oplus_3 e(r_n) \| r_n \oplus_3 H(\tilde{m}_n \oplus_3 e(r_n))}_{\text{of length } l/R}). \quad (6)$$

As above, this divides m into equal block size blocks $m=m_1\|m_2\| \ldots \|m_n$, where now $m_i=\tilde{m}_i\oplus_3 e(r_i)\|r_i\oplus_3 H(\tilde{m}_i\oplus_3 e(r_i))$.

During decoding, each $m_i$ is validated for correctness by itself, as follows:

1. Define the first $l/R-l_r$ digits in $m_i$ as $\tilde{m}_i \oplus_3 e(r_i)$.
2. Compute the hash value.
3. Define $r_i$ as the last $l_r$ digits in $m_i$, subtracted bitwise modulo 3 from the value in operation (2).
4. Compute $e(r_i)$.

5. Obtain $\tilde{m}_i$ via $e(r_i)$ from the value obtained in operation (1).
6. Obtain $\tilde{M}_i$ and $ID_i$ from each $\tilde{m}_i$ according to their respective lengths.
7. Define z as the k digits in $ID_i$ immediately following the (fixed length) identifying info $ID_{ter}$ in $ID_i$.
8. Check if z is a string of k 1's. If so, return i, $\tilde{M}_i$ and $ID_{ter}$. Otherwise report an error.

Operation 5 relies on verifying the final product and proves that this is the original encoded data. Without knowing what the original data are, the algorithm can verify whether the original and final data are the same. The algorithmic security check (number 7 in Operation 5) will only pass for blocks that are entirely correct. This includes correctness for the data as well as the addressing component. In particular, any nucleotide errors as well as wrong placement will lead to an error message. To find which one is correct, one string is to be identified. Provable optimal asymmetric encryption utilizes the additional feature of maintaining secrecy. We adapted the underlying premise of this approach to our algorithm. In essence, it is impossible to get a valid ciphertext other than starting with the message (i.e. the data to be encoded) and encoding it with the above algorithm.

A necessary condition for the security check in number 7 in Operation 5 is that all of the encoded part of the block is obtained and decoded correctly. Any error during decoding will lead to a decoded value of z that is not all 1's. This is based on the fact that if the decoded value of e(r) or of $H(\tilde{m}_i\oplus_3 e(r_i))$ and the original value are not the same, then it is unlikely that the random cryptographic functions will result in the desired value of z.

Any possible error during the entire synthesis process will be detected but may not be corrected at this point. This includes errors during message DNA preparation, or if the sequencing depth for some bases is zero, i.e., if some data were consumed during the process. In the algorithm, the message part contains both the original data component as well as its corresponding indexing information. The check guarantees validity of the data part and establishes that the addressing information will be obtained correctly as the check applies to both; thus, wrong placement is impossible. In particular, the algorithm can verify if the decoded message is the same as the original message, and any nt error or wrong placement will lead to an error message. Typically, with next generation sequencing, there will be numerous correct reads. Even though the original message is the same as the original message, and any nt error or wrong placement will lead to an error message. Typically, with next generation sequencing, there will be numerous correct reads. Even though the original message is never seen, it can be verified as correct. Thus alignment and comparison are not necessary. When one correct string has been identified, the process of identifying the next correct string can proceed. Finally, on average, this should be a great saving over current alignment based techniques to identify correct strings. Only one correct string needs to be identified. If there is no single correct string this will be identified quickly by the algorithmic check, in which case majority voting is to be applied for each base individually.

The price for this security check is the number k of 1's added to $ID_i$. In provably secure cryptographic systems there is considerable uncertainty regarding acceptable limits to k. In one example embodiment, k=10 or 15 should be large enough such that a block of 1's is unlikely to be present by chance. The length of k effectively defines the possible length of $\tilde{M}$ and of $ID_i$.

Figure 1:
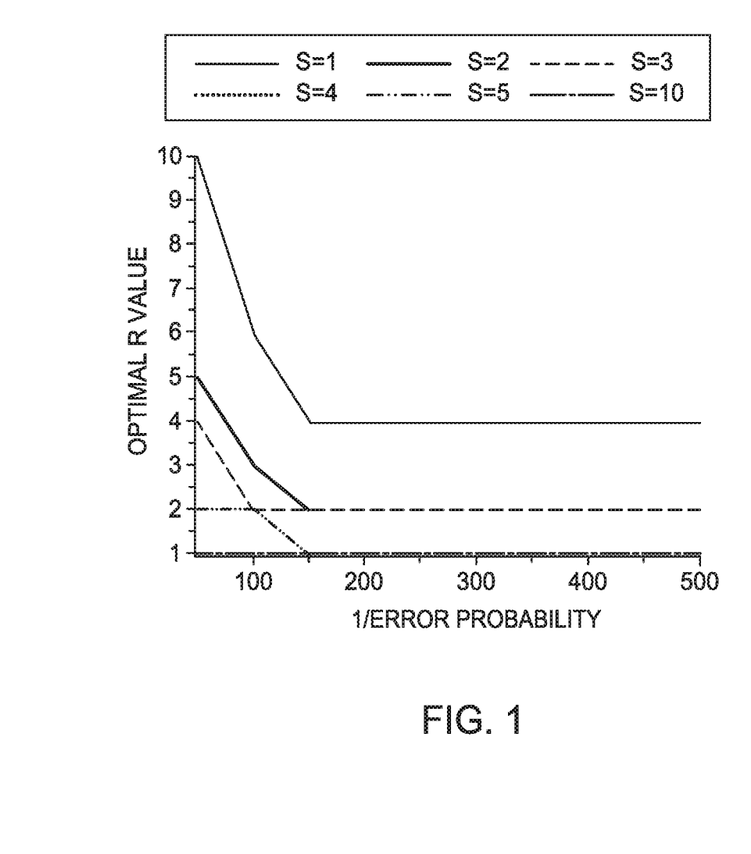
FIG. 1 is a graph of optimal R value vs 1/Error Probability

FIGS. 1 and 2 summarize example of choices for R and S illustrating the strengths of the described algorithm operations above without the use of cryptograph. Small values of S are included to reflect poor sequencing quality. In reality, S should be much larger, making the schemes more robust. With current technologies, the probability of errors for a DNA sequence is about 1/500 during synthesis and 1/100 during sequencing. In example embodiments, the mean error rate per base at the level of sequencing reads was 1/250, which was higher than the combined synthesis and sequencing error rate reported above because of additional errors that were introduced by incorrect indexing.

In information theory, cryptographic hash functions are a means for providing authenticity. Secure hash functions have been developed that are mathematically strong in a range of situations. For example, they are used to check whether a file has been changed. The hash value of the file is sorted separately and the integrity of the file is checked by computing the hash value of the actual file and comparing it with the stored hash value. If the hash values are the same, then the file is unchanged.

The incorporation of hash functions improves the previous algorithms by providing proof as to whether errors occurred during message DNA generation. Practically, hash functions generate a very short output, so the cost in message expansion via $H(\tilde{M})$ is minimal.

With current technologies, syntheses and sequencing results in a large pool of correct oligos or strings.

Modern sequence alignment algorithms have several challenges. Two significant challenges relate to the enormous amount of short reads generated by next generation DNA sequencing technologies and the appropriate choice of the reference genome, allowing for mismatches and gaps. Contrary to algorithms developed for sequence alignment for DNA, encoding the decoder has no known reference sequence. A large number of reads are received, many with errors. Currently, majority voting for each individual base is used to inform decision making regarding the most likely correct base. The main problem with this approach is the enormous amount of data that is needed to be stored, compared and evaluated, as well as the problem of systemic errors. A solution is present to these errors. First, the solution identifies one complete correct sequence among the many assuming that at least one complete correct sequence exists. The main task is to differentiate the difference from the many without having to analyze enormous numbers of comparisons. Second, randomization is added to deter any systemic errors.

Figure 3:
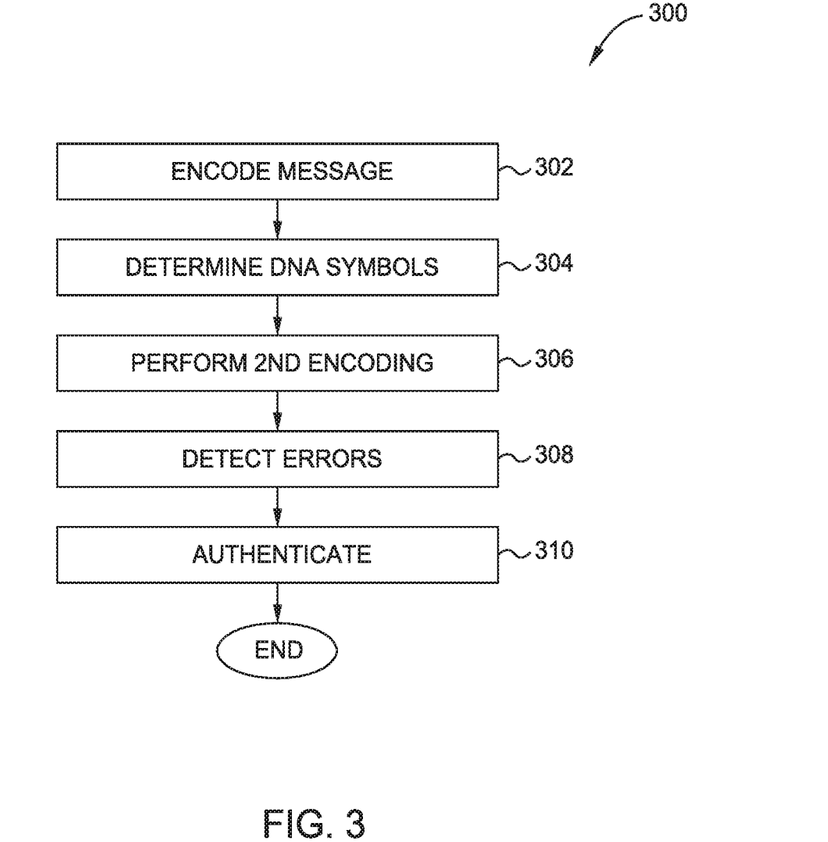
FIG. 3 is a graph of a first example method in accordance with one example embodiment of the disclosure.

Referring to FIG. 3, an example embodiment of a non-limiting method 300 is disclosed. Wherein the method 300 is illustrated in accordance with an example embodiment. A message is encoded into blocks at 302. At 304, a collection of DNA symbols is determined for each of the blocks from the encoded message. At 306, a second encoding is performed. At 308, errors are detected in the second encoding. At 310, an authentication is performed at each block.

Figure 4:
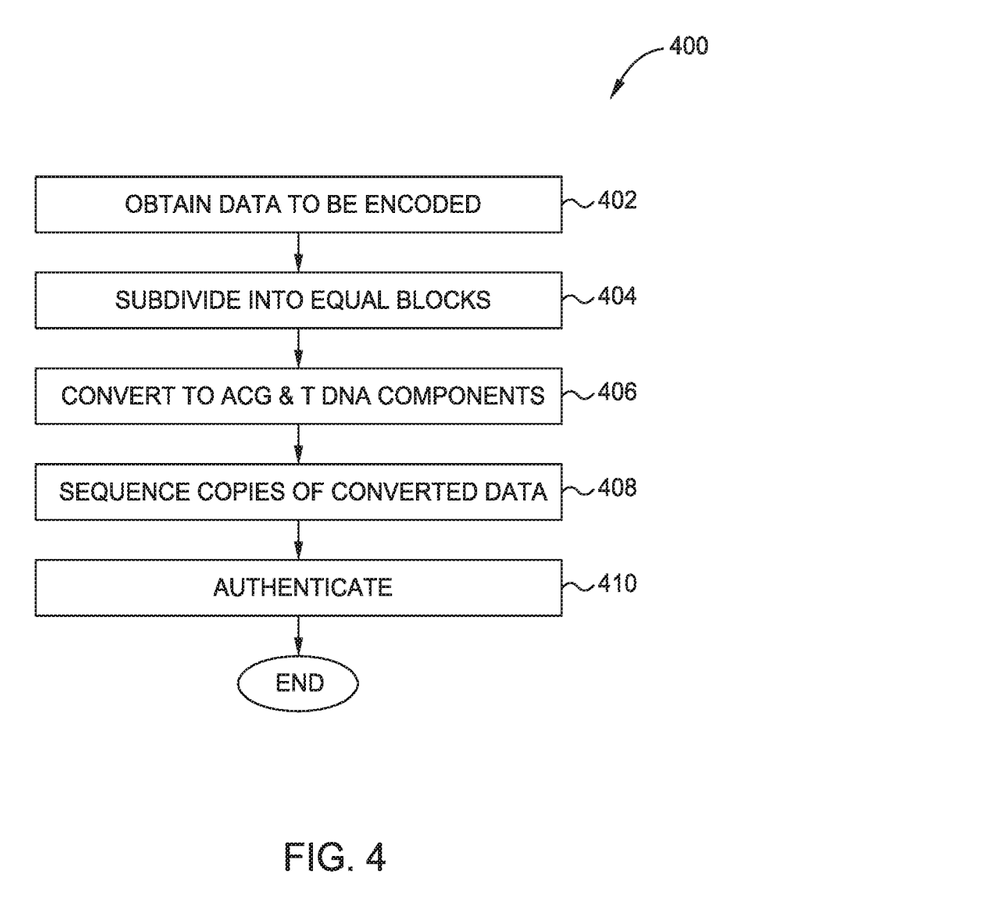
FIG. 4 is a graph of a second example method in accordance with another example embodiment of the disclosure.

Referring to FIG. 4, another example embodiment a method 400 of encoding data in DNA is also disclosed. At 402, a set of data to be encoded. The data may be related to identification, or other purposes. The set of data, at 404, is then subdivided into equal length blocks. The subdivided blocks are then converted, at 406, onto sets of A, C, G and T DNA components. A sequencing may then occur, at 408 for the number of copies. At 410, an authentication of each set of converted data may occur.

Figure 5:
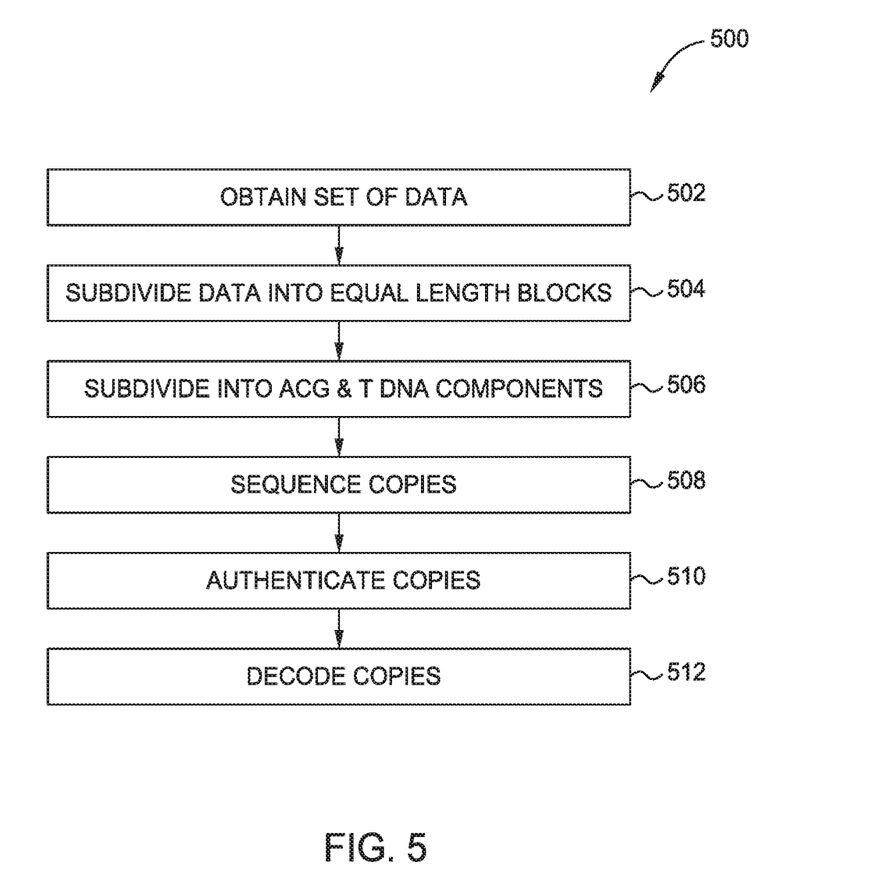
FIG. 5 is a graph of a third example method in accordance with another example embodiment of the disclosure.

In a still further example embodiment in FIG. 5, a method of encoding data in DNA 500 is disclosed. At 502 obtaining a set of data to be encoded is obtained. At 504 the set of data is subdivided into equal length blocks. At 506, the subdivided set of data is converted into A, C, G and T DNA components. At 508 sequencing a number of copies of the converted set of data are sequenced. At 510 an authentication of each of the set of converted data. At 512, the method provides for decoding the sequenced number of copies of the converted set of data is performed.

Example Embodiment

Generally, the value of R is chosen such that R•S is larger than a required Hamming distance. (FIGS. 1 and 2). Here R=3 to illustrate application of the algorithm. If l=198 is the largest integer less or equal to $l_0$=200 for which l/R=66 is an integer. In the example, the file identifier has a fixed length=3 and the ternary string $ID_{ter}$=021.

Let the message be given in ternary as M=22002120022222210210100110222101221111002112-011211112101202022122211
01001112220000200022101111021012100102120002020-02001102101212211112021100010020212000120001112002102121011102101001120-010002201222201122100121211001222010121010012120012210012211
0100221012222011221001212200112211002122110022121100021210
010002201222201122100121 110. The length of this is 210 and can be written in ternary as $l_3$=210=$(21210)_2$.

Choice of Parameters and Encoding

Let $l_r$=5 be the length of the randomizers $r_i$.

Let $l_{id}$=17 be the length of the identifier, i.e the addressing information for each message component.

Let the fixed length of the ternary representation of $l_M$=be $l_b$=8. $l_M$ is $l_3$ prepended with zeros to give this desired length. Here, $l_M$=00021210.

To obtain $\tilde{M}$, one has to append exactly p zeros to M such that the length of M plus $l_b$ plus p is divisible by (l/R-$l_{id}$-$l_r$)=44. Here, 210+8+2=220=5·44 shows that p=2. Therefore M=M0000021210, where M is as above in ternary.

Then n=len($\tilde{M}$)/(l/R-$l_{id}$-$l_r$) is the number of blocks that will have to be sequenced. Here, len ($\tilde{M}$) is the length of the ternary representation of $\tilde{M}$ and therefore n=220/44=5.

Let the length of the ternary representation of the internal counter i be 10. This is the counter of the blocks, i.e. i=1, . . . , n.

Let the size of the security parameter k be 10. This is the number of, say, Is that is appended to the counter l inside of each identifier.

This results in n=5 identifiers $ID_1$=02111111111110001, . . . , $ID_5$=02111111111110012 which are obtained from $ID_{twe}$=021, appended with the k lx and the counter l (in ternary) with internal padding to give the fixed length of each $ID_i$ to be $l_{id}$=17.

Specifically,
M=22002120022222210210100110222101012211110021-120112111121012020221222110100112200002000221011110210121001021200020020-011021012122111120211000
10020212000120001112002102121011102101001121010-00112000100020122201122 100121100000021210 (which is the length 220). Further when incorporating the specific identifiers including the string of the k lx, the n=5 internal blocks m are $m_1$22002120-

02222222102101001102221012211110021120211111111-110001, . . . , $m_5$=0100112001000220-12222011221001210000002121002111111111110012.

Each of these has length $l/R-l_r=61/$

Let $r_1$=020000, ..., r5=11211 random ternary strings of length $l_r$=5.

The expansion function be computed via the internal hash function of Maple, by computing the hash of these $r_i$. The output of the hash function is a hexadecimal string of length 32 that can be converted into the corresponding ternary string. To find e($r_i$), the ternary representation of has $r_i$, H($r_i$), is chosen for only the first 61=len(m) ternary digits. For instance, H($r_i$)=82fc813ae79eea7e3c24af961f59e6cf and therefore e($r_i$)=112000202202121010120221 20-122121212110201111221110101200 10021.

Bitwise addition modulo 3 of $m_1$ and e($r_1$) results in 0020211021210101122212220001122210022120022021-222121201120022 which is the first part of $m_1$.

Analogously, the hash of this is now computer via the hexadecimal has of Maple converted to ternary and then truncated to the desired length !$_r$=5. Again, the hash is added bitwise modulo 3 to $r_i$ to give the second part of the $m_i$. For instance H=12200. Therefore, e.g. $m_1$=0020211021210101122212220001122210022120 02-20212221212011120022 1220 0.

The $t_i$ are constructed by repeating each of the $m_i$ exactly R=3 times. E.g., $t_1$=0020211021210101122212220001 1-2221002212002202122212 1201120022122000 02021102121010112221222000112221002 21200220-2122212120112002212200002021102121010112221222000112221002212002202122 21-2120112002212200. Each of the $t_i$ has length 3 66=198 which is l, as desired. Finally each of these is represented in base four via the base-3 to DNA encoding by homopolymers.

Overall, the result of the encoding part is a list of n=5 DNA segments, e.g. the first being

```
DNA1 = CGCGCTCGCTGACTAGATGCTGCACGTCTGCAGTATGATACAT
ATCATGATCACTCACGCCAGCACGTATATCTATCAGTCGAGCATCATGTA
CTCATGACGCAGCGTGCGCTGCAGCTGTCTGTATGATGTACGCGCTCGCT
GACTAGATGCTGCACGTCTGCAGTATGATACATATCATGATCACTCACGC
AGCACG.
```

Decoding

Each of the n segments of the DNA is reconverted into their base 3 equivalents. For example, $DNA_1$ becomes: 0020211021210101122212220001122210022120 0220-21222121201120022122000020 2110212101011222122200011222100221200220212221 2-120112002212200002021101221010112221222000112221 002212002202122 21 212-0112002212200 which, if correct, is $t_1$ Each of these n recovered segments are then divided into R subcomponents of equal size. For instance, the first component gives the three subpieces: 002021102121010112-2212220001122210022120022012221212011200 22122-00, 002021102121010112221222000112221002212002 20-2122212120112002212200, 00202110212101011222122200011222100221200220 21-222121201120022 12200.

These should be all the same strings, repeated R=3 times. During decoding, a simple majority vote will compare each of the entries in these R subpieces and return the most likely entry for each individual digit. Here, since there were no errors, only one of these same substrings is computed. Doing this for all the n=5 recovered DNA strings yields the original strings $m_1$ ..., $m_5$.

This concludes the part of the method that utilized repetition codes. However, this part may not detect all possible errors. The next operations illustrate how the additional components derived from cryptographic methods address this issue.

Each of the recovered blocks (which should be the $m_i$ and which for simplicity are terms $m_i$ although it still must be confirmed that they are the same as the original $m_i$ is by itself validated for correctness, as detailed in OPERATION 5 as follows:

Let $Y_i$ be the last $l/R-l_r$=61 digits for each of the recovered blocks $m_i$. For instance, the $Y_i$ recovered from $m_i$ is "0020211021210101122212220001122210022120 02202-1222121201120022". The hash value for this gives "19e30bb67ee7486df967389903d1487b". This allows for the recomputation of the $r_1$=020000. The expansion function applied to this yields e($r_1$)=112000202-2021210101202212012212121211102011112211101012-0010021. Subsequently, $m_1$ is recovered as 22002120022222210210100110222101221111002 11202-111111111110001.

The crucial operation is done via recovering the $ID_i$ and testing if they are of the correct form, i.e. with a desired number of 1's. For instance $ID_1$ is recovered as 02111111111110001. The first three digits yield $ID_{ter}$=021 and the next k=10 consecutive 1's. If this test is passed, the entire component $m_i$ is therefore proven to be correct. If all the $m_i$ are validated then this gives the original message m along with a proof that the recovered m is the same as the original.

Error Detection and Correction

The internal repetition into R segments constitutes a classis repetition code with straight forward error correcting properties. A simple majority will identify less than (R−1)/w substitution errors. Internal R-fold repetition is achieved and is demonstrated above to illustrate the choice of the parameters. However, the strength of the method does not rely on this part and indeed one could achieve strong security even for R=1, due to the cryptography part integrated in Operation 4 and Operation 5.

If the size of the security parameter k is large enough then any category of error will be identified during decoding. In case of any error, the security check will not pass for a large enough k. For instance, if during decoding the second piece $m_2$ suffers from a deletion at position 3 (after majority decoding), then the decoding routine will recompute the following $ID_2$=00221011122012. It does not end in the desired k>5 1s and the error is detected.

In the illustrated embodiments, it does not matter what type and how many errors occur. In order to obtain the desired string of k 1's, the entire message $m_i$ is recomputed correctly; this is known of "all-or-nothing" security. In order to recover $m_i$, one must recover both parts of $m_i$ in their entirety. The first part is required to recover $r_i$ from the second part, and $r_i$ is required to recover m; from its first part. Since any changed bit of a cryptographic hash completely changes the result, the entire part of $m_i$ must both be completely recovered. Above, R=3 allows the correction of single substitution errors during majority voting. The extra security feature testing for the k 1's provides an addition feature that identifies any type of error that escaped detection, including substitution, deletion, or insertion errors. It gives a guarantee for those strings that are recovered in their entirety.

$l_o$ is the largest length of segments chosen that are amendable to manipulation l is the actual block length of each sequence that is sequenced.

R is the number of repetitions of the same sequence inside each sequenced block. R is chosen such that R/l is an integer and according to some additional technical requirements detailed below to ensure a required Hamming distance.

$L_{id}$ is the length of the identifier for each message block.

$L_r$ is the length of the input string r.

$ID_i$ concatenation of the file identifier and the internal counter.

S is the sequencing depth and is a parameter that identifies a number of sequences to be recovered.

M is the original message.

$M_i$ is the number of equal length blocks within M.

$m_i$, $m_j$ are the individual message blocks with their identifiers, after incorporation of the respective cryptographic operations.

r, ri is the pseudorandom string of length lr $e(r_i)$ is a cryptographic expansion function that takes a shore random string $r_i$ and outputs a longer random string $e(r_i)$.

$\tilde{m}_i \oplus_3 e(r_i) \| r_i$ is a random string $r_i$ of length $l_r$ chosen from data m and direct summed modulo 3 with m. Each of these has length i/R.

H(M) is the hash value of M.

K is the security parameter underlying the cryptographic OAEP scheme.

Z is the last k digits of $m_i$. These k strings are checked for a specific pattern. Used in Operation 5 to ensure authenticity of the individual segments.

In another example embodiment, the basic cryptographic building block is defined as a zero-knowledge (ZK) proof of knowledge of a hidden signature to constitute the designated confirmer signature. ZK proofs are both convincing and yet yield no identifying key code information beyond the validity of the assertion being proved. They are typically used to force malicious parties to behave according to a predetermined protocol.

The specific cyber-security protocol may be as follows: let Σ be a digital signature scheme given by its key generation protocol Σ.keygen which generates a key pair [Σ.sk] and [Σ.pk] consisting of the secret and private key for the signature generation and verification protocols, respectively. Let Γ by a cryptosystem described by Γ.keygen that generates the pair (public key=Γ.pk, private key=Γ.sk) to be used for encryption and decryption. Classes and properties required for Σ and Γ suitable for designated confirmer signatures. To give a specific example, Σ will be represented by a suitable RSA signature scheme and Σ by ElGamal.

The Full Domain Hash RSA signature scheme Σ is given by the key pair (Σ.pk=(N,e), Σ.sk=d) where N is an RSA modulus and ed≡1 mod ϕ(N). The keys here are those used by the signer. With all computations in $Z_N^*$, a valid signature σ on a message m is defined via $\sigma = H(m)^d$, where H is a public hash function. The verification equation will make use of the following one-way function and image.

$$f(x) = x^e \text{ and } l = H(m)$$

f is homomorphic as for all $x, y \in Z_N^*$, $f(xy) = f(x)f(y)$.

An encryption scheme Γ is used. It operates in a group ($\mathcal{G}, \cdot) = \langle g \rangle$ of large enough order where computing discrete logarithms to base g is difficult. The confirmer's secret key is Γ.sk=x and the corresponding public key is Γ.pk=y=$g^x$. To encrypt a message m∈$\mathcal{G}$, one chooses a random r and computes the ciphertext as the pair ε (m)=($g^r$, m·$y^r$). To decrypt a ciphertext ($K_1, K_2$) one first obtains the session key k=$K_1^x$=$y^r$ and then computes m as $K_2 \cdot k^{-1}$.

Let ∘, the binary operation defined by $\mathcal{G} \times \mathcal{G}$, be the term-wise product (a,b)∘(c,d)=(ac,bd). Fundamental for the construction is the fact that the value is homomorphic since, $$\varepsilon(m) \circ \varepsilon(m') = (\mathcal{G}_r, m \cdot y^r) \circ (\mathcal{G}^s, m' \cdot y^s) = (\mathcal{G}^{r+s}, mm' \cdot y^{r+s}) = \varepsilon(mm').$$

The space of signatures produced by Σ must be the same as the space of messages encrypted by Γ. This can be done as follows: The signer chooses two sufficiently large primes p and q such that p'=(p−1)/2 and q'=(q−1)/2 are prime. The signer sets N=pq and chooses g∈$Z_N^*$ such that (with overwhelming probability) $Q_N$={$a^2$: a∈$Z_N^*$}⊆<g>⊆$Z_N^*$ and sets $\mathcal{G}$=$Q_N$. The signatures produced Σ are mapped into $\mathcal{G}$ by squaring all the parameters (even the bases) before performing any modular operations with them. We also assume that the respective keys are verified with a certificate authority and the respective public parameters are publicly accessible. The symbol ∥ will denote the operation which when applied to two strings m and z results in the 'usual' concatenation of the string m, and the string z.

The individual operations of our cryptographic protocol are described next. Let the given message m be the signature data to be signed. Throughout, if m is given in its binary representation (quartic representation as DNA), then after appropriate parsing m∈$Z_N$ (m∈G) is considered to be the representation of the integer m modulo N (in G). The signer first generated a verifiable signature p on m using the following operations:

(1) The signer chooses $$r \xleftarrow{R} Z_{p'q'}$$

and computes z←$g^r$ in G.

(2) The signer uses his secret key Σ.sk=d of RSA-FDH to compute $\sigma = H(m\|z)^{2d}$.

(3) a is converted into DNA bases via our watermarking protocol below and hidden inside the GMO.

(4) The signer encrypts σ via ElGamal with the confirmer's public key Γ.pk=y=$g^x$ and the random r, ε(σ)=($K_1, K_2$)=($g^r$, σ·$y^r$).

(5) μ=($K_1, K_2$) is stored in an electronic database as the designated confirmer signature of m.

A candidate signature p of m from a public database can only be validated by the TTP according to the following verification protocol.

(1) Given m and μ=($K_1, K_2$), the confirmer computer σ as the decryption of the ElGamal ciphertext ($K_1$=z, $K_2$) using the secret key x.

(2) The confirmer verifies if a is a valid RSA-FDH signature of m∥z by testing $\sigma^e = H(m\|z)^2$ using the signer's public key e.

(3) The signature μ is accepted as valid if and only if this verification operation passes.

Therefore, the algorithm runs as follows:

(1) Determine the number of occurrences $N_i$ of each codon $C_i$ in the host genome, see e.g. [23].

(2) Determine the number $M_j$ of binary triplets $B_j$ in the given binary sequence (with filling in of mock elements to yield a number of characters divisible by 3).

(3) Let $\mathcal{N} = \{A, C, G, T\}$ be the set of nucleotides. There are 24 ways in which these can be ordered. Let $n_1, n_2$ be the first two nucleotides, and $n_3, n_4$ the latter two in an arbitrary ordering.

(4) Associate with each triplets $B_j$ of a given binary string, a set of possible codons $C_j$, $B_1 \mapsto \{n_1n_1n_1, n_1n_1n_2, n_1n_2n_1, \ldots, n_2n_2n_2\}, \ldots B_8 \mapsto \{n_3n_3n_3, n_3n_3n_4, n_3n_4n_3, \ldots, n_4n_4n_4\}$, where the associated codon list excludes the ATG start codon.

(5) The number of times each text triplet is represented by each associated codon $C_j$ is determined according to the following: For each $B_j$ determine the number of occurrences $N_j$ of each of the eight codons $C_j$ that is associated to $B_j$ via the above mapping. Spread out the $N_j$ occurrences of each $B_j$ according to match the individual numbers of occurrences of their associated codons $C_j$.

In one non-limiting embodiment, a method is disclosed comprising: encoding a message into blocks, determining a collection of DNA symbols for each of the blocks from the encoded message, performing a second encoding of the determined collection of DNA symbols from the encoded message, detecting a presence of errors in the second encoding and establishing an authentication of each block.

In another non-limiting embodiment, the method may be performed wherein the second encoding uses a Huffman encoding.

In another non-limiting embodiment, the method may be performed wherein the determining the collection of DNA from the encoded message includes a sequenced number of copies of the message.

In another non-limiting embodiment, the method may be performed wherein the sequenced number of copies is amplified.

In another non-limiting embodiment, the method may be performed wherein the establishing the authentication of each block includes computing a hash value of each block.

In a further non-limiting embodiment, the method may be performed wherein the encoding is within an organism. In a further non-limiting embodiment, the method may be used where DNA is not inserted into an organism.

In a further non-limiting embodiment, a method of encoding data in DNA is disclosed comprising: obtaining a set of data to be encoded, subdividing the set of data into equal length blocks, converting the subdivided set of data into A, C, G and T DNA components, sequencing a number of copies of the converted set of data and establishing an authentication of each of the set of converted data.

In a further example embodiment, the method of encoding may be performed wherein each block of the set of data contains an addressing part.

In a further example embodiment, the method of encoding may be performed wherein each block of the set of data contains a data part.

In a further example embodiment, the method of encoding may be performed wherein the number of copies is greater than or equal to five.

In a further example embodiment, the method of encoding may be performed wherein the sequenced number of copies is amplified compared to the original sequence.

In a further example embodiment, the method of encoding may be performed wherein the converting the subdivided set of data into A, C, G and T DNA components includes using a cryptographic randomization function.

In a further example embodiment, the method may be performed wherein the randomization function results in an R S repetition code.

In a further example embodiment, the method may further comprise detecting errors in one of the sequence of the number of copies and the converted set of data.

In a still further example embodiment, the method may be performed wherein the establishing the authentication of each of the converted set of data includes computing a hash value of each set of data.

In a still further example embodiment, a method of encoding data in DNA is disclosed comprising obtaining a set of data to be encoded, subdividing the set of data into equal length blocks, converting the subdivided set of data into A, C, G and T DNA components, sequencing a number of copies of the converted set of data, establishing an authentication of each of the set of converted data and decoding the sequenced number of copies of the converted set of data.

In a still further example embodiment, the method may further comprise performing an error detection on the converted set of data.

In another example embodiment, the method may further comprise correcting the converted set of data after performing the error detection.

In another example embodiment, the method may be performed wherein the encoding is within an organism.

In another example embodiment, the method may be performed wherein the encoding uses a Huffman code.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method, comprising:
   encoding a message into blocks;
   determining a collection of DNA symbols for each of the blocks from the encoded message;
   sequencing a number of copies of the encoded message;
   performing a second encoding of the determined collection of DNA symbols from the encoded message;
   detecting a presence of errors in the second encoding; and
   establishing an authentication of each block.

2. The method according to claim 1, wherein the second encoding uses a Huffman encoding.

3. The method according to claim 1, wherein the sequenced number of copies is amplified.

4. The method according to claim 1, wherein the establishing the authentication of each block includes computing a hash value of each block.

5. A method of encoding data in DNA, comprising:
   obtaining a set of data to be encoded;
   subdividing the set of data into equal length blocks;
   converting the subdivided set of data into A, C, G and T DNA components;
   sequencing a number of copies of the converted set of data; and
   establishing an authentication of each of the set of converted data.

6. The method of encoding according to claim 5, wherein each block of the set of data contains an addressing part.

7. The method of encoding according to claim 6, wherein each block of the set of data contains a data part.

8. The method of encoding according to claim 5, wherein the number of copies is greater than or equal to five.

9. The method of encoding according to claim 5, wherein the sequenced number of copies is amplified compared to an original sequence.

10. The method of encoding according to claim 5, wherein the converting the subdivided set of data into A, C, G and T DNA components includes using a cryptographic randomization function.

11. The method according to claim 10, wherein the cryptographic randomization function results in an R S repetition code.

12. The method according to claim 5, further comprising:
    detecting errors in one of the sequences of the number of copies and the converted set of data.

13. The method according to claim 5, wherein the establishing the authentication of each of the converted set of data includes computing a hash value of each set of data.

14. A method of encoding data in DNA, comprising:
    obtaining a set of data to be encoded;
    subdividing the set of data into equal length blocks;
    converting the subdivided set of data into A, C, G and T DNA components;
    sequencing a number of copies of the converted set of data;
    establishing an authentication of each of the set of converted data; and
    decoding the sequenced number of copies of the converted set of data.

15. The method according to claim 14, further comprising:
    performing an error detection on the converted set of data.

16. The method according to claim 15, further comprising:
    correcting the converted set of data after performing the error detection.

17. The method according to claim 15, wherein the encoding uses a Huffman code.

* * * * *

SEQUENCE LISTING

```
<160> NUMBER OF SEQ ID NOS: 1

<210> SEQ ID NO 1
<211> LENGTH: 199
<212> TYPE: DNA
<213> ORGANISM: Unknown
<220> FEATURE:
<223> OTHER INFORMATION: Exemplary Embodiment of DNA-Encoded Data to
      Illustrate Choice of Parameters and Encoding
<220> FEATURE:
<221> NAME/KEY: Exemplary Embodiment of DNA-Encoded Data to Illustrate
      Choice of Parameters and Encoding
<222> LOCATION: (1)..(199)
```

-continued

```
<400> SEQUENCE: 1
cgcgctcgct gactagatgc tgcacgtctg cagtatgata catatcatga tcactcacgc    60
cagcacgtat atctatcagt cgagcatcat gtactcatga cgcagcgtgc gctgcagctg   120
tctgtatgat gtacgcgctc gctgactaga tgctgcacgt ctgcagtatg atacatatca   180
tgatcactca cgcagcacg                                                199
```